US012074494B2

(12) United States Patent
Imboden et al.

(10) Patent No.: US 12,074,494 B2
(45) Date of Patent: Aug. 27, 2024

(54) TIMEPIECE MECHANISM PROVIDED WITH A MAGNETIC GEAR

(71) Applicant: The Swatch Group Research and Development Ltd, Marin (CH)

(72) Inventors: Matthias Imboden, St-Blaise (CH); Jean-Pierre Mignot, Pontarlier (FR); Milan Calic, La Conversion (CH); Cédric Nicolas, Neuchâtel (CH); Jean-Jacques Born, Morges (CH)

(73) Assignee: The Swatch Group Research and Development Ltd, Marin (CH)

( * ) Notice: Subject to any disclaimer, the term of this patent is extended or adjusted under 35 U.S.C. 154(b) by 240 days.

(21) Appl. No.: 17/872,544

(22) Filed: Jul. 25, 2022

(65) Prior Publication Data
US 2023/0060562 A1 Mar. 2, 2023

(30) Foreign Application Priority Data
Aug. 30, 2021 (EP) ..................... 21193817

(51) Int. Cl.
*H02K 49/10* (2006.01)
*G04B 13/02* (2006.01)
(52) U.S. Cl.
CPC ........... *H02K 49/102* (2013.01); *G04B 13/02* (2013.01)
(58) Field of Classification Search
CPC ..... G04B 11/005; G04B 13/02; H02K 49/102
See application file for complete search history.

(56) References Cited

U.S. PATENT DOCUMENTS

| 3,400,287 A | 9/1968 | Huff |
| 5,633,555 A | 5/1997 | Ackermann et al. |
| 2017/0176946 A1* | 6/2017 | Junod ................. G04C 3/101 |
| 2017/0242403 A1* | 8/2017 | Di Domenico ........ G04C 5/005 |
| 2023/0062527 A1* | 3/2023 | Imboden .............. G04B 11/005 |

FOREIGN PATENT DOCUMENTS

| FR | 1 584 453 A | 12/1969 |
| GB | 549590 A * | 11/1942 |
| JP | 2005253292 A * | 9/2005 |
| JP | 2016200228 A * | 12/2016 |

OTHER PUBLICATIONS

European Search Report for 21 19 3817 dated Feb. 1, 2022.

* cited by examiner

*Primary Examiner* — Jeremy A Luks
(74) *Attorney, Agent, or Firm* — Sughrue Mion, PLLC (57) ABSTRACT

A mechanism including a magnetic gear including a first wheel, a second wheel and a third wheel. The first wheel is provided with permanent magnetic poles which are arranged so as to form the magnetised teeth of a first magnetic toothing. The second wheel and the third wheel are provided with teeth made of a soft ferromagnetic material respectively defining a second magnetic toothing and a third magnetic toothing, each with a number of teeth that is greater than that of the first magnetic toothing and having a magnetic coupling with this first magnetic toothing. The second magnetic toothing is directly coupled with the first magnetic toothing and with the third magnetic toothing thanks to the magnetic fluxes provided by the magnetised teeth of the first toothing and the teeth of the second magnetic toothing are magnetically separated from one another.

18 Claims, 3 Drawing Sheets

TIMEPIECE MECHANISM PROVIDED WITH A MAGNETIC GEAR

CROSS REFERENCE TO RELATED APPLICATION

The present application is based on, and claims priority from the prior European Patent Application No. 21193817.0, filed on Aug. 30, 2021, the entire contents of which are incorporated herein by reference.

TECHNICAL FIELD OF THE INVENTION

The invention relates to the field of magnetic gears formed by a first wheel and a second wheel meshing with one another magnetically, the first wheel being provided with first permanent magnetic poles, arranged in a circle and defining the magnetised teeth of a first magnetic toothing.

In particular, the invention relates to a mechanism, in particular a timepiece mechanism, incorporating such a magnetic gear.

TECHNOLOGICAL BACKGROUND

Magnetic gears are known devices that can be used to transfer mechanical torque between two parts without any direct contact between the parts, and thus without resulting in wear or friction therebetween. Such gears provide the following benefits:
- no oil or lubricant is required since there is no mechanical wear on the teeth of the parts;
- the toothed parts can interact and transfer torque and mechanical power, even if they are hermetically separated; and
- the toothed parts can be used to limit the maximum torque, and can thus help to avoid damage, for example in the event of a mechanical impact.

Such a magnetic gear typically includes two wheels that mesh with one another magnetically. A first wheel is provided with first permanent magnetic poles, which are typically alternating and arranged in a circle and define a first magnetic toothing. These first magnetic poles are, for example, defined by bipolar magnets with radial and alternating magnetisation. A second wheel is provided with teeth made of a ferromagnetic material or second permanent magnetic poles, these teeth or second magnetic poles being arranged in a circle and defining a second magnetic toothing. The first and second wheels are typically located in the same general plane. The magnetic coupling between the toothings of the first and second wheels means that when one of the first and second wheels is driven such that it rotates, the other wheel is also driven such that it rotates.

However, one drawback of this type of magnetic gear is that it requires at least each tooth of the first wheel to be magnetised (by permanent magnetisation), typically with alternating polarities, regardless of the diameter and the number of teeth of the first toothing. This in particular has two important consequences: firstly, such a magnetic gear is expensive to manufacture; and secondly, whereas the number of teeth of the first toothing contributing, at a given moment in time, to the magnetic interaction between the two wheels is relatively low, the other magnets of the first circular toothing will generate magnetic field lines propagating through the system containing the magnetic gear (typically a timepiece mechanism). However, it is very difficult to contain such magnetic field lines in order to protect the other components of the mechanism from the effect induced by these field lines, in particular a magnetic attraction force that can result in spurious mechanical stresses for certain movable elements of the mechanism. Such an effect can be detrimental to the correct operation of the system, in particular when the system is a horological movement including wheel sets made of a magnetic material.

SUMMARY OF THE INVENTION

The invention thus aims to overcome the drawbacks of the prior art by providing a mechanism, in particular a timepiece mechanism, comprising a magnetic gear which is simple and inexpensive to manufacture, and which allows the number of permanent magnetic poles required for the magnetic gear to be reduced, while enabling the magnetic field lines to be contained in order to protect the various other components of a system containing the mechanism.

For this purpose, the present invention relates to a mechanism, in particular a timepiece mechanism, comprising a magnetic gear including a first wheel and a second wheel, the first wheel being provided with permanent magnetic poles which are arranged so as to form the magnetised teeth of a first magnetic toothing from which first magnetic fluxes of alternating polarities respectively emerge. The second wheel is provided with teeth made of a soft ferromagnetic material defining a second magnetic toothing, the number of teeth of this second magnetic toothing being greater than that of the first magnetic toothing, and having a first magnetic coupling with this first magnetic toothing such that, when one of the first and second wheels is driven such that it rotates, the other wheel is also driven such that it rotates, with a first transmission ratio defined by the first and second magnetic toothings, by said first magnetic coupling which is generated, at least for the most part, by magnetic fluxes, from among said first magnetic fluxes, momentarily polarising, in magnetic attraction, teeth of the second magnetic toothing which are momentarily located in a magnetic coupling zone with the first magnetic toothing and thus through which these magnetic fluxes respectively flow. According to the invention, the magnetic gear further comprises a third wheel provided with teeth made of a soft ferromagnetic material defining a third magnetic toothing, the number of teeth whereof is also greater than that of the first magnetic toothing, the second magnetic toothing being arranged on a rim made of a non-magnetic material with non-magnetic zones between the teeth of this second toothing, the third wheel being disposed relative to the second wheel in such a way that the third magnetic toothing has a second magnetic coupling, in said magnetic coupling zone, with momentarily magnetised teeth of the second magnetic toothing, such that, when one of the second and third wheels is driven such that it rotates, the other wheel is also driven such that it rotates, with a second transmission ratio defined by the second and third magnetic toothings, by said second magnetic coupling which is generated, at least in part, by second magnetic fluxes, respectively emerging from said momentarily magnetised teeth of the second magnetic toothing with alternating polarities, these second magnetic fluxes momentarily polarising, in magnetic attraction, teeth of the third magnetic toothing which are momentarily located in said magnetic coupling zone and thus through which the second magnetic fluxes respectively flow, this magnetic coupling zone defining a magnetic meshing zone for the first, second and third wheels. The soft ferromagnetic material is preferably a material with high magnetic permeability and thus low magnetic reluctance.

Such a magnetic gear mechanism configured in this way produces a local and temporary magnetisation only on the teeth made of a soft ferromagnetic material of the second toothing and of the third toothing that are located in the magnetic coupling zone and that are active at a given moment in time. The number of permanent magnetic poles of the first wheel that are required to generate such local magnetisation is thus substantially reduced. This allows costs to be reduced and simplifies the manufacture of the mechanism, as well as allowing the magnetic field lines in the vicinity of where the torque transfer occurs between the second and third wheels to be contained locally. The presence of teeth made of a soft ferromagnetic material on the second and third wheels, with the specific arrangement of the second toothing which is formed by teeth that are separate from one another and arranged on a non-magnetic support, allows for the closing of the magnetic field lines produced by the permanent magnetic poles of the first magnetic toothing through the second and third magnetic toothings, which results in the magnetic coupling between the second and third wheels and thus the magnetic meshing of these two wheels.

In particular, the various components of a system containing the mechanism, such as a mechanical movement of a timepiece for example, can be better protected from the magnetic field of the permanent magnets, which are fewer in number and can thus be confined and, where appropriate, more easily provided with a magnetic shield. Moreover, such a mechanism according to the invention intrinsically limits the maximum torque transmitted between the second and third wheels, thus protecting the gear from damage caused by a mechanical impact.

Preferably, the first wheel includes at least four magnetised teeth. Generally speaking, the first magnetic toothing comprises N1 teeth, the second magnetic toothing comprises N2 teeth, and the third magnetic toothing comprises N3 teeth. Advantageously, the number N1 is an even number between four and ten, inclusive; and the ratio between the number N2 and the number N1, and the ratio between the number N3 and the number N1, are each greater than or equal to two, preferably greater than or equal to three. This improves the efficiency of the magnetic coupling between the first, second and third wheels for a limited number of magnets.

In a general alternative embodiment, each of the second and third wheels includes at least six teeth which extend radially relative to the rotational axis of the wheel concerned. Each tooth takes the form of a protrusion that projects from an annular periphery of the wheel. In particular, each of the second and third wheels includes between six and thirty teeth which extend radially relative to the rotational axis of the wheel.

According to a specific alternative embodiment, the first wheel is furthermore mechanically coupled to the second wheel, in particular by way of a mechanical gear. This alternative embodiment guarantees permanent optimum alignment between the permanent magnetic poles of the first wheel and the teeth made of a soft ferromagnetic material of the second wheel, and thus forces the second wheel to precisely follow the rotational movement of the first wheel, and vice-versa.

According to a specific alternative embodiment, the first wheel is mounted such that it can rotate freely. This other alternative embodiment allows the first magnetic coupling to be generated without friction between the first wheel and the second wheel.

According to a preferred embodiment of the invention, the first wheel is disposed, when projected on a first plane in which the second wheel extends and perpendicular to the rotational axis of this second wheel, inside a circle circumscribed about this second wheel.

According to a first alternative to the preferred embodiment, the first wheel is disposed substantially in said first plane, within the second wheel which has, in this first plane, an annular shape with no crossings, the magnetised teeth of the first toothing being arranged such that the first magnetic fluxes emerge from these magnetised teeth in a main radial direction relative to the rotational axis of the first wheel.

According to a second alternative to the preferred embodiment, the first wheel is disposed outside the first plane with the rotational axis thereof arranged perpendicular to this first plane, the magnetised teeth of the first toothing being arranged such that the first magnetic fluxes emerge from these magnetised teeth in a main direction that is oblique or parallel to the rotational axis of the first wheel (axial polarisation).

Advantageously, the first wheel has a central part made of a ferromagnetic material, on the periphery whereof its said permanent magnetic poles are arranged in pairs respectively with as many complementary magnetic poles, thus forming bipolar magnets having radial polarisation and respectively defining the magnetised teeth of the first magnetic toothing. This enables the magnetic field lines between adjacent bipolar magnets to be effectively closed via the central part of the first wheel.

In an advantageous alternative embodiment, the second and third magnetic toothings have different pitches. It should be noted that the pitch of a toothing is defined as being the length of the arc of a circle between two adjacent teeth of this toothing on a circle of contact with a toothed wheel meshing with this toothing. This effectively compensates for the rotational offset between the second and third wheels, thereby improving the efficiency of the magnetic gear. Preferably, by optimally spacing the teeth of the second wheel and the third wheel, an optimal torque transfer is obtained between these wheels. When the second and third wheels have the same diameter, the second wheel can thus include N2 teeth and the third wheel can include N3 teeth, where the number N3 of teeth of the third wheel is greater than the number N2 of teeth of the second wheel.

In a specific alternative embodiment, the mechanism further includes a non-return device mechanically coupled to the third wheel. This prevents the wheels from slipping backwards, which can occur in particular with a high restoring torque, such as when a drive spring is wound for example. Such slippage can cause a runaway effect that is detrimental to the mechanism, whereby the third wheel rotates freely in the opposite direction to that of the desired torque transfer. Such a runaway effect can, for example, be initiated by a vibration, an impact, or any other mechanical disturbance within the mechanism in question (for example the winding of a spring).

Advantageously, the third wheel comprises a rim, forming a continuous circular base for the third magnetic toothing, which is made of a soft ferromagnetic material, so as to form a closure for the magnetic paths of the second magnetic fluxes generating the magnetic coupling between the second and third wheels.

According to an advantageous embodiment of the invention, the magnetic gear further comprises a fourth wheel provided with permanent magnetic poles which are arranged so as to form the magnetised teeth of a fourth magnetic toothing from which third magnetic fluxes with alternating polarities respectively emerge. In this advantageous embodiment, the third magnetic toothing is arranged, like the second toothing, on a rim made of a non-magnetic material with non-magnetic zones between the teeth of this third toothing. The fourth wheel is then disposed, when projected on a second plane in which the third wheel extends and perpendicular to the rotational axis of this third wheel, inside a circle circumscribed about this third wheel. The second and third magnetic toothings each have a greater number of teeth than the fourth magnetic toothing, the third magnetic toothing further having a third magnetic coupling with this fourth magnetic toothing such that, when one of the third and fourth wheels is driven such that it rotates, the other wheel is also driven such that it rotates, with a third transmission ratio defined by the third and fourth magnetic toothings, by the third magnetic coupling which is generated, for the most part, by magnetic fluxes, from among said third magnetic fluxes, momentarily polarising, in magnetic attraction, teeth of the third magnetic toothing which are momentarily located in a magnetic coupling zone with the fourth magnetic toothing and thus through which these magnetic fluxes respectively flow. The fourth wheel is arranged in such a way that said magnetic coupling zone with the first wheel and the magnetic coupling zone with this fourth wheel are at least for the most part superimposed, and that the second and third magnetic fluxes, which thus pass through teeth of the third toothing located in a magnetic coupling zone that is common to the first and fourth wheels, have the same polarity in each of these teeth. Finally, said second magnetic coupling between the second and third magnetic toothings is further generated in part by fourth magnetic fluxes respectively emerging from said teeth of the third magnetic toothing momentarily magnetised by the fourth magnetic toothing, these fourth magnetic fluxes further momentarily polarising, in magnetic attraction, respectively teeth of the second magnetic toothing which are momentarily located in said magnetic coupling zone with the fourth wheel.

This advantageous embodiment improves the efficiency of the magnetic coupling between the second and third wheels. The magnetic gear can thus be symmetrical.

Preferably, the fourth wheel includes at least four magnetised teeth. The fourth magnetic toothing comprises N4 teeth, and the third magnetic toothing comprises N3 teeth. The number N4 is advantageously an even number between four and ten, inclusive; and the ratio between the number N3 and the number N4 is greater than or equal to two, preferably greater than or equal to three.

According to a first alternative embodiment, the fourth wheel is disposed substantially in said second plane, within the third wheel which has, in this second plane, an annular shape with no crossings, the magnetised teeth of the fourth toothing being arranged such that the third magnetic fluxes emerge from these magnetised teeth in a main radial direction relative to the rotational axis of the fourth wheel.

According to a second alternative embodiment, the fourth wheel is disposed outside said second plane with the rotational axis thereof arranged perpendicular to this second plane, the magnetised teeth of the fourth toothing being arranged such that the third magnetic fluxes emerge from these magnetised teeth in a main direction that is oblique or parallel to the rotational axis of the fourth wheel (axial polarisation).

As with the first wheel, in the case where the fourth wheel comprises a plurality of bipolar magnets with radial polarisation, the fourth wheel advantageously has a central part made of a ferromagnetic material, at the periphery whereof are arranged, in pairs, its permanent magnetic poles with respectively as many complementary magnetic poles, thus forming the plurality of bipolar magnets which define the magnetised teeth of the fourth magnetic toothing. The fourth wheel is preferably mounted such that it can rotate freely.

According to one example embodiment of the invention, the second and third wheels are coplanar.

According to another example embodiment of the invention, the second and third wheels extend in separate planes. According to a first alternative embodiment, these separate planes are not parallel. According to another alternative embodiment, these separate planes are parallel, the second and third magnetic toothings being advantageously at least partially superimposed with one another in said magnetic coupling zone with the first magnetic toothing.

BRIEF DESCRIPTION OF THE FIGURES

The purposes, advantages and features of the mechanism according to the invention will appear more clearly in the following description of various non-limiting embodiments shown by way of the drawings, in which.

DETAILED DESCRIPTION OF THE INVENTION

Figure 1:
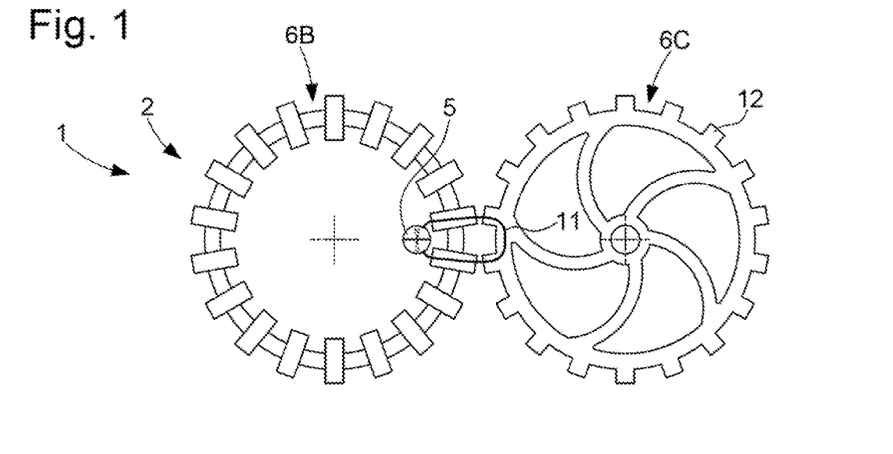
FIG. 1 is a top view of a mechanism incorporating a magnetic gear according to a specific alternative embodiment of the invention.

FIG. 1 shows a specific alternative embodiment of the mechanism 1 according to the invention, in particular of the timepiece type, comprising a magnetic gear 2 which is the subject of the invention. The present invention was drawn from the general inventive idea consisting of providing, in the magnetic gear 2, two wheels 6B, 6C, each provided with teeth made of a soft ferromagnetic material, preferably with relatively high magnetic permeability, with at least one of these two wheels 6B, 6C being magnetically coupled to another wheel, of smaller diameter and in particular with pinion-like dimensions, provided with permanent magnetic poles 7 which are arranged in a circle about the rotational axis thereof. In FIG. 1, this other wheel is formed by a single rotating element 5 with permanent magnetisation, which is a rotating bipolar magnet 5 in the form of a disc with a central rotational axis that is perpendicular to the magnetic axis of this bipolar magnet. The rotating bipolar magnet 5 produces a magnetic field coupled to two respective parts of the wheels 6B, 6C which are located in a magnetic coupling zone between the two wheels 6B, 6C corresponding to the magnetic meshing zone of these two wheels 6B, 6C.

The magnetic field generated by the rotating bipolar magnet 5 produces a local and temporary magnetisation on each of the two wheels 6B, 6C, more specifically in the teeth made of a soft ferromagnetic material of these wheels 6B, 6C which are active at a given moment in time, i.e. which are momentarily located in the magnetic meshing zone which corresponds by definition to the magnetic coupling zone provided between these two wheels 6B, 6C. The number of permanent magnetic poles of the wheel illustrated by the rotating element 5, which are required to generate such a local magnetisation, is thus substantially reduced to at least two magnetic poles forming a bipolar magnet. The two wheels 6B, 6C are arranged in such a way that the teeth of the wheel 6B and the teeth of the wheel 6C have, partially and successively in groups of adjacent teeth, a direct magnetic coupling with one another in the magnetic meshing zone, this direct magnetic coupling being induced by the permanent magnetic poles 7 of the small wheel 5, via the teeth of the wheel 6B magnetised by these permanent magnetic poles 7. Thus, when one of the two wheels 6B, 6C or the small wheel 5 is driven such that it rotates, the other two wheels are also driven such that they rotate as a result of the magnetic coupling, in attraction, between teeth of these three wheels 5, 6B, 6C in the magnetic meshing zone provided for these three wheels 5, 6B, 6C. In order to avoid the magnetic field leaking along field lines not shown in FIG. 1, the distance between two adjacent teeth of the wheel 6B is advantageously designed to be greater than twice the shortest distance between the respective teeth of the two wheels 6B, 6C. The magnetic field lines 11 produced by the magnetic coupling between the three wheels 5, 6B, 6C are thus contained locally in the vicinity of where the torque transfer occurs between the wheels 6B and 6C.

In the description hereinbelow, elements denoted by the same reference numerals are analogous. Without this limiting the scope of the present invention, the mechanism 1 is preferably a timepiece mechanism.

As shown in FIGS. 2 to 7, the magnetic gear 2 includes at least three wheels 6A, 6B, 6C. Generally speaking, a first wheel 6A, which is smaller in diameter than the other two wheels 6B, 6C, is provided with N1 permanent magnetic poles 7 which are arranged in a circle and define a first magnetic toothing 8. The N1 permanent magnetic poles 7 form the magnetised teeth of the first magnetic toothing 8 from which first magnetic fluxes of alternating polarities emerge. As the magnetic poles 7 are arranged in a circular manner with alternating polarisation, there is an even number thereof. Preferably, the number N1 is an even number between four and ten, inclusive. In FIGS. 2 to 6, the outer magnetic poles 7 of the first wheel 6A, associated with as many inner magnetic poles, thus form bipolar magnets, with radial polarisation, which respectively define the magnetised teeth of the first magnetic toothing 8.

A second wheel 6B is provided with N2 teeth made of a soft ferromagnetic material defining a second magnetic toothing 10. The second magnetic toothing 10 is arranged on a rim 14 made of a non-magnetic material, with non-magnetic zones between the teeth of the second toothing 10. The number N2 of teeth of the second wheel 6B is greater than the number N1 of magnetic poles 7 of the first wheel 6A. The ratio between the number N2 of teeth of the second wheel 6B and the number N1 of magnetic poles 7 of the first wheel 6A is advantageously greater than or equal to two, preferably greater than or equal to three. The second magnetic toothing 10 has a first direct magnetic coupling with the first magnetic toothing 8 such that, when one of the first and second wheels 6A, 6B is driven such that it rotates, the other wheel 6A, 6B is also driven such that it rotates, with a transmission ratio defined by the first and second toothings 8, 10, by the first direct magnetic coupling between these first and second toothings 8, 10. This first direct magnetic coupling is generated, at least for the most part, by magnetic fluxes from among the first magnetic fluxes emerging from the first toothing 8 which momentarily polarise, in magnetic attraction, teeth of the second magnetic toothing 10 which are momentarily located in a magnetic coupling zone with the first magnetic toothing and thus through which these magnetic fluxes respectively flow.

A third wheel 6C is provided with N3 teeth made of a soft ferromagnetic material defining a third magnetic toothing 12. Without this limiting the scope of the present invention, the diameter of the second and third wheels 6B, 6C is identical. The number N3 of teeth of the third wheel 6C is greater than the number N1 of magnetic poles 7 of the first wheel 6A. The ratio between the number N3 of teeth of the third wheel 6C and the number N1 of magnetic poles 7 of the first wheel 6A is advantageously greater than or equal to two, preferably greater than or equal to three. The third wheel 6C is disposed relative to the second wheel 6B in such a way that the third magnetic toothing 12 has a second direct magnetic coupling, in the continuation of the magnetic coupling zone between the first and second toothings 8, 10, with momentarily magnetised teeth of the second magnetic toothing 10. In this way, when one of the second and third wheels 6B, 6C is driven such that it rotates, the other wheel 6B, 6C is also driven such that it rotates, with a transmission ratio defined by the second and third magnetic toothings 10, 12, by the second direct magnetic coupling between these second and third toothings 10, 12. This second direct magnetic coupling is generated, at least in part, by second magnetic fluxes respectively emerging from the momentarily magnetised teeth of the second magnetic toothing 10 with alternating polarities, these teeth having themselves been momentarily magnetised by the permanent magnetic poles 7 of the first wheel 6A, via the first direct magnetic coupling. These second magnetic fluxes thus momentarily polarise, in magnetic attraction, teeth of the third magnetic toothing 12 which are momentarily located in the magnetic coupling zone between the first, second and third wheels and through which the second magnetic fluxes respectively flow.

The teeth of the second and third wheels 6B, 6C are made of a soft ferromagnetic material, preferably with high magnetic permeability, such as Mu-metal for example.

Preferably, and as shown in FIGS. 2 to 7, the first wheel 6A is disposed, when projected on a first plane P1 in which the second wheel 6B extends and perpendicular to the rotational axis of this second wheel 6B, inside a circle circumscribed about this second wheel 6B. The second and third wheels 6B, 6C can extend in one and the same general plane, or in separate planes that may or may not be parallel to one another. When the second and third wheels 6B, 6C extend in separate planes substantially parallel to one another, the second and third magnetic toothings 10, 12 are preferably at least partially superimposed in the magnetic coupling zone with the first magnetic toothing 10. The first, second and third wheels 6A, 6B, 6C are arranged such that the magnetic toothings 8, 10, 12 thereof do not touch one another.

A first preferred embodiment of the mechanism 1 comprising a magnetic gear 2 according to the invention will be described hereinbelow with reference to FIGS. 2, 3 and 6. According to this preferred embodiment of the mechanism 1, the magnetic gear 2 includes the three wheels 6A, 6B, 6C. The magnetised teeth 7 of the first toothing 8 are arranged such that the first magnetic fluxes emerge from these magnetised teeth 7 in a main direction which is radial relative to the rotational axis of the first wheel 6A, the bipolar magnets defining the magnetised teeth thus having radial polarisation/magnetisation. The first and second magnetic couplings are entirely generated by first magnetic fluxes emerging from the outer permanent magnetic poles 7 of the first wheel 6A. The permanent magnetic poles 7 are typically arranged in pairs respectively with as many complementary magnetic poles, around a central part 9 forming the axis of the first wheel 6A or in an opening through which such an axis passes, the central part 9 being advantageously made of a ferromagnetic material or a Mu-metal material. Preferably, as shown in FIGS. 2, 3 and 6, the first wheel 6A is mounted such that it can rotate freely on its axis.

Figure 2:
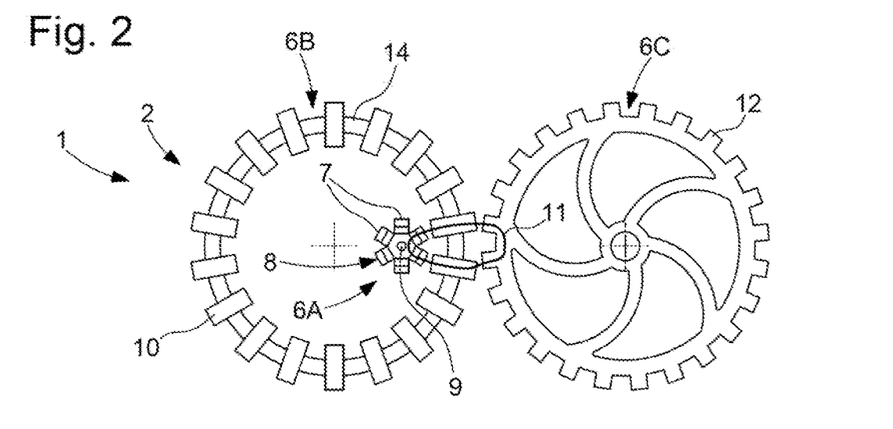
FIG. 2 is a top view, similar to that in FIG. 1, according to a first example of a first preferred embodiment of the mechanism of the invention.

In a first example of the first preferred embodiment of the mechanism 1, shown in FIG. 2, the first wheel 6A is disposed substantially in the first plane P1, within the second wheel 6B. The second wheel 6B thus forms a kind of shield for the first wheel 6A. The second wheel 6B has an annular shape with no crossings in the first plane P1. The first wheel 6A comprises six bipolar magnets with radial magnetisation, which respectively form the magnetised teeth of the first magnetic toothing 8. The second wheel 6B comprises eighteen teeth made of a soft ferromagnetic material forming the second magnetic toothing 10. The third wheel 6C comprises an annular rim made of a non-magnetic material, typically made of a soft ferromagnetic material, defining, at the outer periphery thereof, twenty-four teeth made of a soft ferromagnetic material forming the third magnetic toothing 12. This annular rim forms a continuous circular base for the third magnetic toothing 12. This alternative embodiment effectively compensates for the rotational offset between the second and third wheels 6B, 6C, thereby improving the efficiency of the magnetic gear 2, since the number N3 of teeth of the third wheel 6C is greater than the number N2 of teeth of the second wheel 6B. More generally, in this first example of the first preferred embodiment, the second and third magnetic toothings 10, 12 have different toothing pitches. The pitch of a toothing 10, 12 is defined as being the length of the arc of a circle between two adjacent teeth of this toothing 10, 12 on a circle of contact with a toothed wheel meshing with this toothing 10, 12. Preferably, by optimally spacing the teeth of the second wheel 6B and the third wheel 6C, an optimal torque transfer is obtained between these wheels 6B, 6C.

Figure 3:
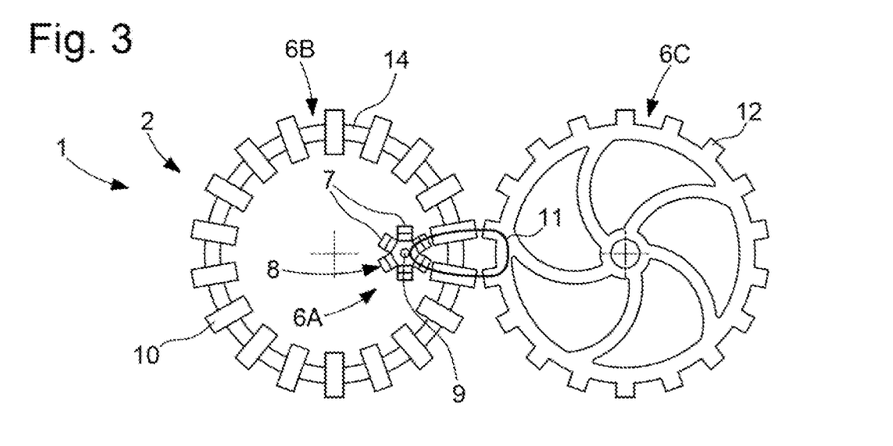
FIG. 3 is a similar view to that in FIG. 2, according to a second example of the first embodiment of the mechanism of the invention.

According to a second example of the first preferred embodiment of the mechanism 1, shown in FIG. 3, the first wheel 6A comprises six bipolar magnets with radial magnetisation and respectively forming the magnetised teeth of the first magnetic toothing 8. The second wheel 6B comprises eighteen teeth made of a soft ferromagnetic material forming the second magnetic toothing 10. The third wheel 6C comprises an annular rim made of a non-magnetic material, typically made of a soft ferromagnetic material, also defining, at the outer periphery thereof, eighteen teeth made of a soft ferromagnetic material forming the third magnetic toothing 12.

Figure 6:
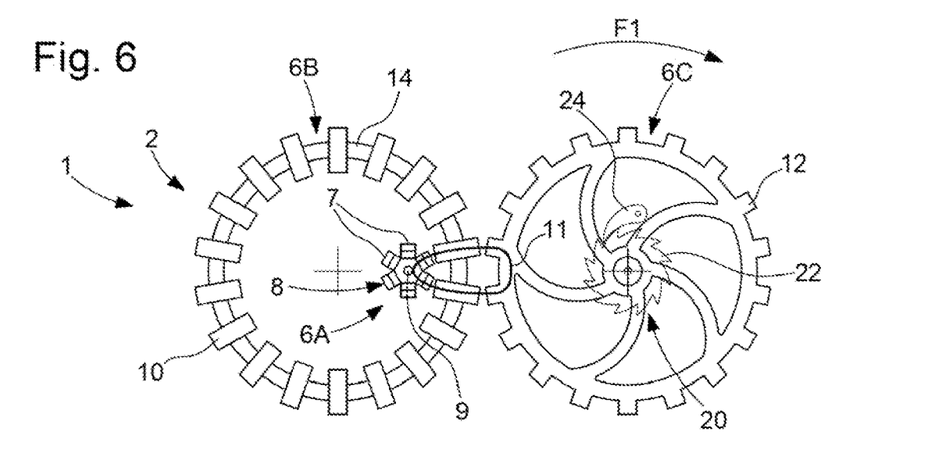
FIG. 6 is a similar view to that in FIG. 3, according to a third example of the first embodiment of the mechanism of the invention, and wherein the mechanism of the invention includes a non-return device mechanically coupled to a wheel of the magnetic gear.

According to a third example of the first preferred embodiment of the mechanism 1, shown in FIG. 6, the mechanism 1 further includes a non-return device 20 mechanically coupled to the third wheel 6C. According to the specific embodiment shown in FIG. 6, the non-return device 20 typically includes a ratchet wheel 22 and a pawl 24. The ratchet wheel 22 is fixed to the third wheel 6C for rotation therewith, and is provided with teeth that extend radially relative to the rotational axis of the wheel 22. The pawl 24 cooperates with the teeth of the ratchet wheel 22 in such a way as to prevent the third wheel 6C from rotating in the direction opposite to the direction corresponding to the desired torque transfer, in this instance in the direction shown by the arrow F1 in the example embodiment in FIG. 6. This prevents the third wheel 6C from turning freely in the direction of this arrow F1 in the event of vibration, an impact or any other mechanical disturbance within the timepiece mechanism (the winding of a spring for example), which could be detrimental to the mechanical integrity thereof. Although the presence of this feature has been illustrated with reference to the first preferred embodiment of the mechanism 1, it can just as well be envisaged for any other embodiment of the mechanism 1 according to the invention.

A second advantageous embodiment of the mechanism 1 comprising a magnetic gear 2 according to the invention will be described hereinbelow with reference to FIGS. 4 and 5. According to this second embodiment of the mechanism 1, the magnetic gear 2 includes, in addition to the three wheels 6A, 6B, 6C, a fourth wheel 6D. The fourth wheel 6D is smaller in diameter than the second and third wheels 6B, 6C, and is provided with N4 outer permanent magnetic poles 15 arranged in a circle and which define a fourth magnetic toothing 16. The N4 permanent magnetic poles 15 form the magnetised teeth of the fourth magnetic toothing 16 from which third magnetic fluxes of alternating polarities emerge. As the magnetic poles 15 are arranged in a circular manner with alternating polarisation, there is an even number thereof. Preferably, as with the first wheel 6A, the number N4 is an even number between four and ten, inclusive. In particular, the first and fourth wheels are identical or similar, where N1=N4.

The outer magnetic poles 15 are typically arranged in pairs respectively with as many inner magnetic poles (complementary magnetic poles), thus forming a plurality of bipolar magnets having radial polarisation and arranged around a central part 17 forming the axis of the fourth wheel 6D, or in an opening through which an axis passes. The central part 17 is advantageously made of a ferromagnetic material or of a Mu-metal material. The number N2 of teeth of the second wheel 6B and the number N3 of teeth of the third wheel 6C are greater than the number N4 of magnetic poles 15 of the fourth wheel 6D. In the second embodiment, the third magnetic toothing 12 is arranged, like the second toothing, on a rim 14 made of a non-magnetic material with non-magnetic zones between the teeth of this third toothing. The magnetised teeth 15 of the fourth toothing 16 are arranged such that the third magnetic fluxes emerge from these magnetised teeth in a main direction which is radial relative to the rotational axis of the fourth wheel 6D, the bipolar magnets thus having radial polarisation/magnetisation. The third magnetic coupling between the fourth wheel and the third wheel is generated for the most part by third magnetic fluxes emerging from the magnetised teeth 15.

The third magnetic toothing 12 has a third magnetic coupling with the fourth magnetic toothing 16 such that, when one of the third and fourth wheels 6C, 6D is driven such that it rotates, the other wheel 6C, 6D is also driven such that it rotates, with a transmission ratio defined by the third and fourth magnetic toothings, by the third magnetic coupling. This third magnetic coupling is generated, for the most part, by magnetic fluxes from among the third magnetic fluxes generated by the fourth toothing 16 which momentarily polarise, in magnetic attraction, teeth of the third magnetic toothing 12 which are momentarily located in a magnetic coupling zone with the fourth magnetic toothing 16 and thus through which these third magnetic fluxes respectively flow. As shown in FIGS. 4 and 5, the fourth wheel 6D is arranged in such a way that the magnetic coupling zone with the first wheel 6A and the magnetic coupling zone with the fourth wheel 6D are at least for the most part superimposed, and that the second and third magnetic fluxes, which thus pass through the same teeth of the third toothing 12 located in a magnetic coupling zone that is common to the first and fourth wheels 6A, 6D, have the same polarity in each of these teeth. The second magnetic coupling between the second and third magnetic toothings 10, 12 is thus further generated in part by fourth magnetic fluxes emerging respectively from teeth of the third magnetic toothing 12 momentarily magnetised by the third magnetic fluxes emerging from the fourth magnetic toothing 16. More specifically, the second magnetic coupling is generated substantially in equal parts, because of the symmetry of the system, by the second magnetic fluxes (generated by first magnetic fluxes provided by the first permanent-magnet toothing) and by the fourth magnetic fluxes (generated by third magnetic fluxes provided by the fourth magnetic permanent-magnet toothing). These fourth magnetic fluxes also momentarily polarise, in part, in magnetic attraction, respectively teeth of the second magnetic toothing 10 which are momentarily located in the magnetic coupling zone with the fourth wheel 6D.

Preferably, the fourth wheel 6D is disposed, when projected on a second plane in which the third wheel 6C extends and perpendicular to the rotational axis of this third wheel 6C, inside a circle circumscribed about this third wheel 6C. Preferably, the fourth wheel 6D is mounted such that it can rotate freely on its axis. Even more preferably, the diameter of the first and fourth wheels 6A, 6D is identical.

Figure 4:
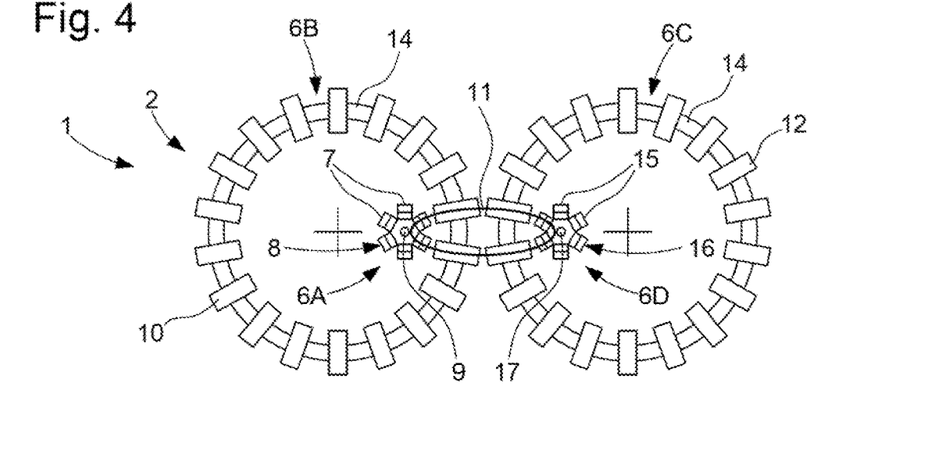
FIG. 4 is a similar view to that in FIG. 2, according to a first example of a second advantageous embodiment of the mechanism of the invention.

In a first example of the second embodiment of the mechanism 1, shown in FIG. 4, the fourth wheel 6D is disposed substantially in the second plane in which the third wheel 6C extends, within the third wheel 6C. The third wheel 6C thus forms a kind of shield for the fourth wheel 6D. According to this example embodiment, the third wheel 6C has an annular shape with no crossings in the second plane. Each of the first and fourth wheels 6A, 6D comprises six bipolar magnets with radial magnetisation. The six bipolar magnets of the first wheel 6A, respectively of the fourth wheel 6D, form the first magnetic toothing 8, respectively the fourth magnetic toothing 16. The first and fourth wheels 6A, 6D are advantageously mounted such that they can rotate freely on the respective axes thereof. The magnetised teeth 15 of the fourth toothing 16 are arranged such that the third magnetic fluxes emerge from these magnetised teeth 15 in a main direction which is radial relative to the rotational axis of the fourth wheel 6D, the bipolar magnets thus having radial polarisation or magnetisation. The second and third wheels 6B, 6C each comprise eighteen teeth made of a soft ferromagnetic material.

Figure 5:
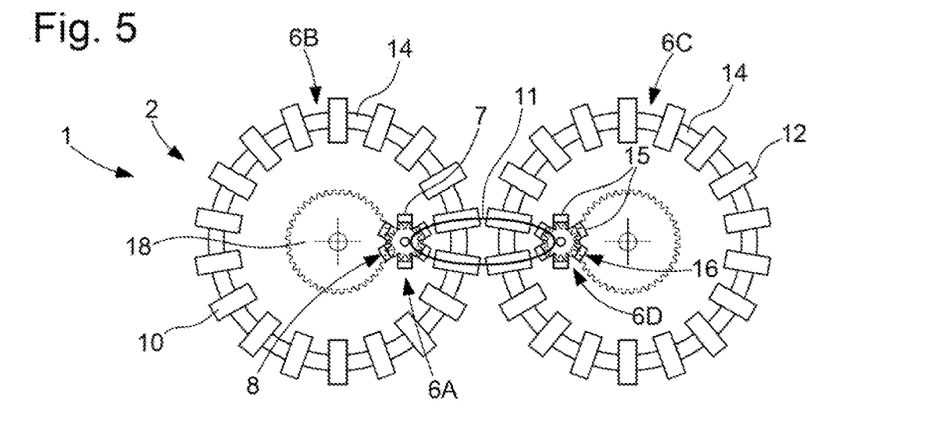
FIG. 5 is a similar view to that in FIG. 4, according to a second example of the second embodiment of the mechanism of the invention.

A second example of the second embodiment of the mechanism 1, shown in FIG. 5, differs from the first example in that the first wheel 6A, respectively the fourth wheel 6D, is mechanically coupled to the second wheel 6B, respectively to the third wheel 6C, via a respective mechanical gear 18 of the mechanism 1. Although the presence of this feature has been illustrated with reference to the second embodiment of the mechanism 1, it can just as well be envisaged for any other embodiment of the mechanism 1 according to the invention. It should be noted that the respective numbers of teeth of the second and third magnetic toothings can be different and that, as with the first embodiment, the pitch of the teeth of the second magnetic toothing and the pitch of the teeth of the third magnetic toothing can advantageously be somewhat different.

According to another example of the second embodiment of the mechanism 1, not shown in the figures, the fourth wheel 6D is disposed outside the second plane with the rotational axis thereof arranged perpendicular to this second plane. The third and fourth wheels 6C, 6D thus extend in different planes, parallel to one another. The magnetised teeth 15 of the fourth toothing 16 are thus arranged in such a way that the third magnetic fluxes emerge from these magnetised teeth 15 in a main direction that is oblique or parallel to the rotational axis of the fourth wheel 6D. The fourth wheel 6D can typically be arranged above or below the third wheel 6C, such that the two respective toothings 12, 16 thereof have, when projected on the plane, circumscribed circles with a point of contact (tangent to one another with one inside the other), or optionally with a slight recess.

According to another example of the second embodiment of the mechanism 1, not shown in the figures, the fourth wheel 6D is disposed outside the second plane with the rotational axis thereof arranged in an oblique manner relative to this second plane. The magnetised teeth 15 of the fourth toothing 16 are thus arranged in such a way that the third magnetic fluxes emerge from these magnetised teeth 15 in a main direction that is radial relative to the rotational axis of the fourth wheel 6D.

Figure 7:
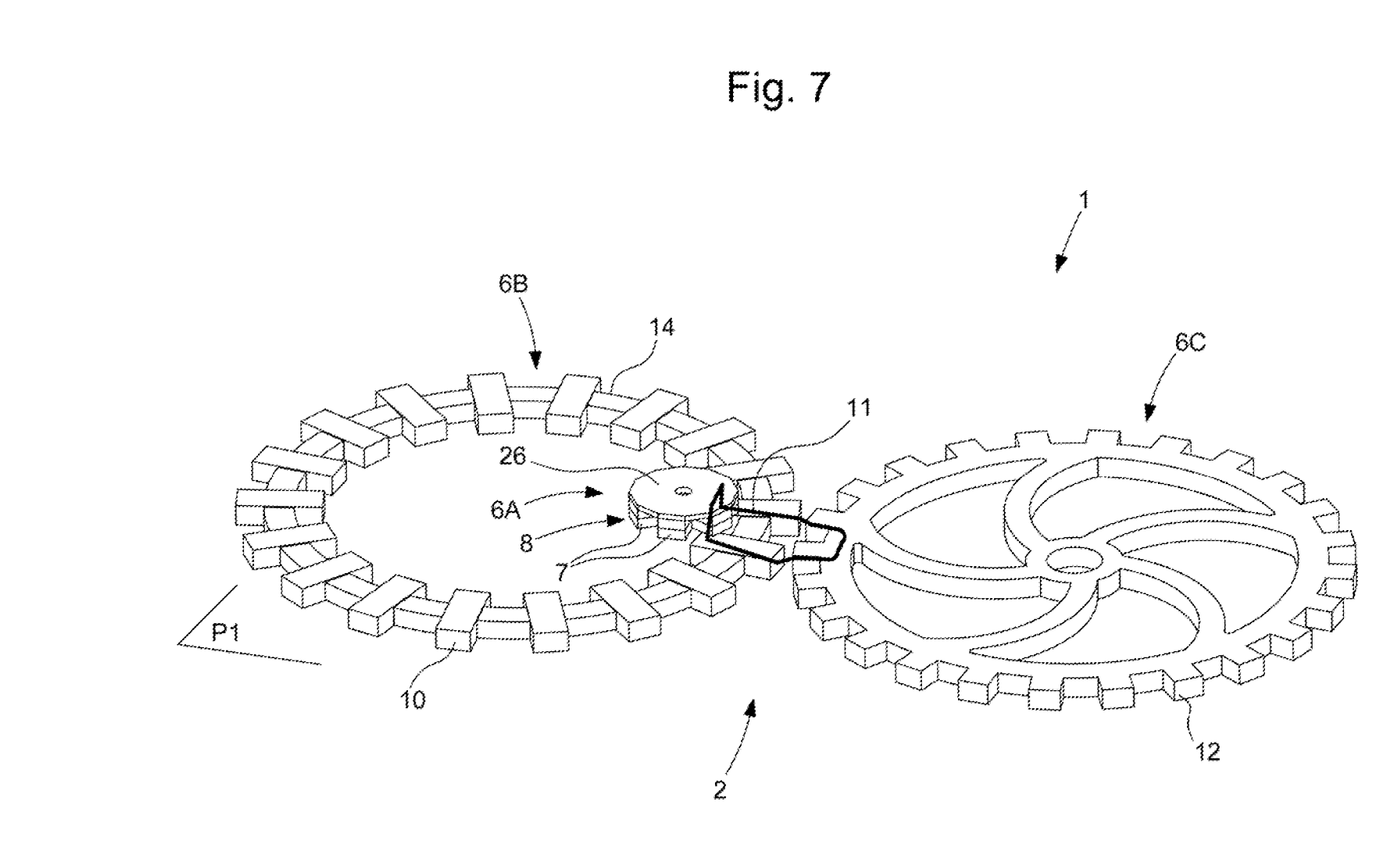
FIG. 7 is a perspective view of an example of a third specific embodiment of the mechanism of the invention.

A third specific embodiment of the mechanism 1 comprising a magnetic gear 2 according to the invention will be described hereinbelow with reference to FIG. 7. According to this third embodiment of the mechanism 1, the magnetic gear 2 includes the three wheels 6A, 6B, 6C. The first wheel 6A is disposed outside the first plane P1, in which the second wheel 6B extends, with the rotational axis thereof arranged perpendicular to this first plane P1. The first and second wheels 6A, 6B thus extend in different planes, parallel to one another. The magnetised teeth 7 of the first toothing 8 are arranged such that the first magnetic fluxes emerge from these magnetised teeth 7 in a main axial direction, i.e. parallel to the rotational axis of the first wheel 6A, the bipolar magnets 7 thus having axial polarisation or magnetisation. More specifically, the first wheel 6A is arranged above the second wheel 6B, such that the two respective toothings 8, 10 thereof are partially superimposed, the bipolar magnets 7 which momentarily generate the first and second magnetic couplings being superimposed on the second toothing and located at a relatively small distance from this second toothing. The first and second magnetic couplings are entirely generated by first magnetic fluxes emerging from the outer permanent magnetic poles 7 of the first wheel 6A. One line 11 of the magnetic field produced by two adjacent magnets of the first wheel and substantially generating the magnetic coupling between the three wheels 6A, 6B, 6C are shown in FIG. 7. Preferably, the first wheel 6A is mounted such that it can rotate freely.

The lower magnetic poles 7 are typically arranged in pairs respectively with as many upper magnetic poles (complementary magnetic poles) under an upper disc 26 mounted on the first wheel 6A, the upper disc 26 being advantageously made of a ferromagnetic material or a Mu-metal material. The upper disc 26 of the first wheel 6A thus enables the magnetic fluxes of the magnets to be closed on the side opposite the second magnetic toothing.

Different possibilities exist for arranging the first and second wheels 6A, 6B in different planes, parallel to one another. For example, a first possibility consists of using a plate in which a circular recess is made. The plate thus defines two levels: an upper level on which one of the two wheels 6A, 6B, preferably the second wheel 6B, can be disposed; and a lower level in the bottom of the recess on which the other wheel 6A, 6B, preferably the first wheel 6A, can be disposed. Alternatively, the bottom of the recess can comprise a device for holding the first wheel 6A inside this recess. In the latter case, the second wheel 6B can have crossings in the plane P1, which are connected to an arbor. Another possibility is to use a ring, of the date ring type, placed in a groove and driven by this groove such that it rotates.

According to another embodiment of the mechanism 1, not shown in the figures, the magnetic gear 2 includes the three wheels 6A, 6B, 6C. The first wheel 6A is disposed outside the first plane P1 with the rotational axis thereof arranged perpendicular to this first plane P1. The first and second wheels 6A, 6B thus extend in different planes, parallel to one another. The magnetised teeth 7 of the first toothing 8 are arranged in such a way that the first magnetic fluxes emerge from these magnetised teeth 7 in a main direction that is oblique relative to the rotational axis of the first wheel 6A. In the latter case, the first wheel 6A is thus arranged slightly behind the second toothing of the second wheel 6B, for example in such a way that the two respective toothings 8, 10 thereof have, when projected on the plane P1, respectively a circumscribed circle and an inscribed circle which substantially touch at one point.

According to another embodiment of the mechanism 1, not shown in the figures, the magnetic gear 2 includes the three wheels 6A, 6B, 6C. The first wheel 6A is disposed outside the first plane P1 with the rotational axis thereof arranged in an oblique manner relative to this first plane P1. The first and second wheels 6A, 6B thus extend in different planes and an angle is formed therebetween. The magnetised teeth 7 of the first wheel 6A are thus advantageously arranged in such a way that the first magnetic fluxes emerge from these magnetised teeth 7 in a main direction that is radial relative to the rotational axis of the first wheel 6A. The first and second magnetic couplings are entirely generated by first magnetic fluxes emerging from the outer permanent magnetic poles 7 of the first wheel 6A.

A general alternative embodiment provides for one of the second and third wheels being driven such that it rotates by a drive device and is thus driving in the magnetic gear, and the other of these two wheels is driven to carry out a function of the mechanism or to transmit a torque in this mechanism. The first wheel and, where appropriate, the fourth wheel are mounted such that they can rotate freely or such that they are mechanically coupled only to the second and third wheels respectively.

The invention claimed is:

1. A timepiece mechanism comprising:
a magnetic gear (2) including a first wheel (6A) and a second wheel (6B), the first wheel (6A) being provided with permanent magnetic poles (7) which are arranged so as to form the magnetised teeth of a first magnetic toothing (8) from which first magnetic fluxes of alternating polarities respectively emerge;
wherein the second wheel is provided with teeth made of a soft ferromagnetic material defining a second magnetic toothing (10), the number of teeth of this second magnetic toothing (10) being greater than that of the first magnetic toothing (8), and having a first magnetic coupling with this first magnetic toothing (8) such that, when one of the first and second wheels (6A, 6B) is driven such that it rotates, the other wheel is also driven such that it rotates, with a first transmission ratio defined by the first and second magnetic toothings, by said first magnetic coupling which is generated, at least for the most part, by magnetic fluxes, from among said first magnetic fluxes, momentarily polarising, in magnetic attraction, teeth of the second magnetic toothing (10) which are momentarily located in a magnetic coupling zone with the first magnetic toothing (8) and thus through which these magnetic fluxes respectively flow; and
wherein the magnetic gear (2) further comprises a third wheel (6C) provided with teeth made of a soft ferromagnetic material defining a third magnetic toothing (12), the number of teeth whereof is also greater than that of the first magnetic toothing (8), the second magnetic toothing (10) being arranged on a rim made of a non-magnetic material with non-magnetic zones between the teeth of this second toothing, the third wheel (6C) being disposed relative to the second wheel (6B) in such a way that the third magnetic toothing (12) has a second magnetic coupling, in said magnetic coupling zone, with momentarily magnetised teeth of the second magnetic toothing (10), such that, when one of the second and third wheels (6B, 6C) is driven such that it rotates, the other wheel is also driven such that it rotates, with a second transmission ratio defined by the second and third magnetic toothings, by said second magnetic coupling which is generated, at least in part, by second magnetic fluxes, respectively emerging from said momentarily magnetised teeth of the second magnetic toothing (10) with alternating polarities, these second magnetic fluxes momentarily polarising, in magnetic attraction, teeth of the third magnetic toothing (12) which are momentarily located in said magnetic coupling zone and thus through which the second magnetic fluxes respectively flow, this magnetic coupling zone defining a magnetic meshing zone for the first, second and third wheels.

2. The timepiece mechanism (1) according to claim 1, wherein the first magnetic toothing (8) comprises N1 teeth, the second magnetic toothing (10) comprises N2 teeth, and the third magnetic toothing (12) comprises N3 teeth; wherein the number N1 is an even number between four and ten, inclusive; and wherein the ratio between the number N2 and the number N1, and the ratio between the number N3 and the number N1, are each greater than or equal to two, preferably greater than or equal to three.

3. The timepiece mechanism (1) according to claim 1, wherein the first wheel (6A) is furthermore mechanically coupled to the second wheel (6B), in particular via a gear train (18).

4. The timepiece mechanism (1) according to claim 1, wherein the first wheel (6A) is mounted such that it can rotate freely.

5. The timepiece mechanism (1) according to claim 1, wherein the first wheel (6A) is disposed, when projected on a first plane (P1) in which the second wheel (6B) extends and perpendicular to the rotational axis of this second wheel (6B), inside a circle circumscribed about this second wheel (6B).

6. The timepiece mechanism (1) according to claim 5, wherein the first wheel (6A) is disposed substantially in said first plane (P1), within the second wheel (6B) which has, in the first plane (P1), an annular shape with no crossings, the magnetised teeth (7) of the first toothing (8) being arranged such that the first magnetic fluxes emerge from these magnetised teeth (7) in a main radial direction relative to the rotational axis of the first wheel (6A).

7. The timepiece mechanism (1) according to claim 5, wherein the first wheel (6A) is disposed outside the first plane (P1) with the rotational axis thereof arranged perpendicular to this first plane (P1), the magnetised teeth (7) of the first toothing (8) being arranged such that the first magnetic fluxes emerge from these magnetised teeth (7) in a main direction that is oblique or parallel to the rotational axis of the first wheel (6A).

8. The timepiece mechanism (1) according to claim 5, wherein the first wheel (6A) is disposed outside the first plane (P1), with the rotational axis thereof arranged in an oblique manner relative to this first plane (P1), the magnetised teeth (7) of the first toothing (8) being arranged such that the first magnetic fluxes emerge from these magnetised teeth (7) in a main radial direction relative to the rotational axis of the first wheel (6A).

9. The timepiece mechanism (1) according to claim 1, wherein the first wheel has a central part (9) made of a ferromagnetic material, on the periphery whereof its said permanent magnetic poles (7) are arranged in pairs respectively with as many complementary magnetic poles, thus forming bipolar magnets which respectively define said magnetised teeth of the first magnetic toothing.

10. The timepiece mechanism (1) according to claim 1, wherein the second and third magnetic toothings (10, 12) have different pitches, the pitch of a toothing being defined as being the length of the arc of a circle between two adjacent teeth of this toothing on a circle of contact with a toothed wheel meshing with this toothing.

11. The timepiece mechanism (1) according to claim 1, wherein it further includes a non-return device (20) mechanically coupled to the third wheel (6C).

12. The timepiece mechanism (1) according to claim 1, wherein the third wheel (6C) comprises a rim forming a continuous circular base for the third magnetic toothing (12), which is made of a soft ferromagnetic material so as to form a closure closing magnetic paths of said second magnetic fluxes.

13. The timepiece mechanism (1) according to claim 5, wherein the magnetic gear (2) further comprises a fourth wheel (6D) provided with permanent magnetic poles (15) which are arranged so as to form the magnetised teeth of a fourth magnetic toothing (16) from which third magnetic fluxes with alternating polarities respectively emerge; wherein the third magnetic toothing (12) is arranged on a rim made of a non-magnetic material with non-magnetic zones between the teeth of the third toothing (12), said fourth wheel (6D) being disposed, when projected on a second plane in which the third wheel (6C) extends and perpendicular to the rotational axis of this third wheel (6C), inside a circle circumscribed about this third wheel (6C), the second and third magnetic toothings (10, 12) each having a greater number of teeth than the fourth magnetic toothing (16) and further having a third magnetic coupling with this fourth magnetic toothing (16) such that, when one of the third and fourth wheels (6C, 6D) is driven such that it rotates, the other wheel is also driven such that it rotates, with a third transmission ratio defined by the third and fourth magnetic toothings (12, 16), by the third magnetic coupling which is generated, for the most part, by magnetic fluxes, from among said third magnetic fluxes, momentarily polarising, in magnetic attraction, teeth of the third magnetic toothing (12) which are momentarily located in a magnetic coupling zone with the fourth magnetic toothing (16) and thus through which these magnetic fluxes respectively flow, the fourth wheel (6D) being arranged in such a way that said magnetic coupling zone with the first wheel (6A) and the magnetic coupling zone with this fourth wheel (6D) are at least for the most part superimposed, and that the second and third magnetic fluxes, which thus pass through teeth of the third toothing (12) located in a magnetic coupling zone that is common to the first and fourth wheels (6A, 6D), have the same polarity in each of these teeth, said second magnetic coupling between the second and third magnetic toothings (10, 12) being further generated in part by fourth magnetic fluxes respectively emerging from said teeth of the third magnetic toothing (12) momentarily magnetised by the fourth magnetic toothing (16), these fourth magnetic fluxes further momentarily polarising, in magnetic attraction, respectively teeth of the second magnetic toothing (10) which are momentarily located in said magnetic coupling zone with the fourth wheel (6D).

14. The timepiece mechanism (1) according to claim 13, wherein the fourth wheel (6D) has a central part (17) made of a ferromagnetic material, on the periphery whereof its permanent magnetic poles (15) are arranged in pairs respectively with as many complementary magnetic poles, thus forming bipolar magnets which define said magnetised teeth of the fourth magnetic toothing; and wherein the fourth wheel is mounted such that it can rotate freely.

15. The timepiece mechanism (1) according to claim 1, wherein the second and third wheels (6B, 6C) are coplanar.

16. The timepiece mechanism (1) according to claim 1, wherein the second and third wheels extend in separate planes.

17. The timepiece mechanism (1) according to claim 16, wherein said separate planes are not parallel.

18. The timepiece mechanism (1) according to claim 16, wherein said separate planes are parallel, the second and third magnetic toothings (10, 12) being at least partially superimposed in said magnetic coupling zone with the first magnetic toothing (10).

* * * * *